United States Patent [19]

Becker et al.

[11] 3,888,361

[45] June 10, 1975

[54] PROGRAMMED MANIPULATOR ARRANGEMENT FOR CONTINUOUSLY MOVING CONVEYOR

[75] Inventors: John L. Becker, Sterling Heights, Mich.; Otto Hohnecker, Wilton; Maurice J. Dunne, Newtown, both of Conn.

[73] Assignee: Unimation, Inc., Danbury, Conn.

[22] Filed: May 15, 1974

[21] Appl. No.: 470,216

[52] U.S. Cl. .............................. 214/1 BH; 198/20 R
[51] Int. Cl. ................................................. B23k 9/12
[58] Field of Search ...... 214/1 B, 1 BS, 1 BB, 1 BT, 214/1 BC, 1 BH, 1 BD, 1 BV, 147 T, 1 CM, 11 R; 198/38, 20 R, 19

[56] References Cited
UNITED STATES PATENTS

| | | | |
|---|---|---|---|
| 3,283,918 | 11/1966 | Devol | 214/1 BC |
| 3,543,910 | 12/1970 | Devol et al. | 214/1 BD |
| 3,661,051 | 5/1972 | Dunne et al. | 91/35 |
| 3,665,148 | 5/1972 | Yasenchak et al. | 219/125 R |
| 3,744,032 | 7/1973 | Engelberger et al. | 219/80 X |

*Primary Examiner*—Frank E. Werner
*Attorney, Agent, or Firm*—Mason, Kolehmainen, Rathburn & Wyss

[57] ABSTRACT

A fixed base programmed manipulator arrangement is provided for cooperation with a continuously moving conveyor wherein the manipulator is positioned so that one axis such as the out-in axis, is parallel to the conveyor. Synchronous operation with the conveyor while permitting limited lateral movements of the manipulator arm is achieved by employing a digital conveyor encoder as a source of continuously varying command signals for the out-in axis of the manipulator. The arrangement does not require positioning of the conveyor at a large number of points along its path during the initial teaching mode of the manipulator apparatus.

12 Claims, 10 Drawing Figures

PROGRAMMED MANIPULATOR ARRANGEMENT FOR CONTINUOUSLY MOVING CONVEYOR

The present invention relates to programmed manipulator arrangements, and, more particularly, to programmed manipulator arrangements for cooperating with a continuously moving conveyor.

Many types of arrangements have been heretofore proposed for adapting programmed manipulators to cooperate with a moving conveyor arrangement. For example, Devol U.S. Pat. No. 3,283,918; Engelberger, et al., U.S. Pat. No. 3,744,032; and Yasenchak, et al., U.S. Pat. No. 3,665,148 all disclose continuous conveyor arrangements which are adapted to function with a programmed manipulator. In the Devol and Yasenchak patents the programmed manipulator is programmed while standing still and then is bodily moved along in synchronism with the moving conveyor while the manipulator arm performs a series of work operations on work carried by the manipulator. While these arrangements are generally suitable for their intended purpose, they are relatively expensive since the whole manipulator apparatus must be moved on fixed guide rails parallel to the conveyor.

In Engelberger, et al., U.S. Pat. No. 3,744,032 a fixed base manipulator is employed and a representative workpiece on the conveyor is moved to a large number of different positions in the work area of the conveyor adjacent the fixed base manipulator and these different positions are recorded during the teaching mode of operation of the programmed manipulator. An encoder attached to the conveyor is then employed during the playback or the repeat mode of operation of the manipulator to control the time at which selection of different ones of the command signals in the recorded sequence are selected.

While these arrangements are in general suitable for their intended purposes, it would be desirable to provide an arrangement wherein a fixed base manipulator can be employed in conjunction with a continuously moving conveyor without requiring the recording of a large number of programmed points corresponding to different points along the conveyor path.

It is, therefore, an object of the present invention to provide a new and improved programmed manipulator arrangement for a continuously moving conveyor wherein one or more of the above-discussed disadvantages of the prior art arrangements are avoided.

It is another object of the present invention to provide a new and improved programmed manipulator arrangement for a continuously moving conveyor wherein a conveyor encoder is employed as a continuously varying source of command signals when the manipulator arm is to be moved in a direction generally parallel to the path of movement of the conveyor.

It is another object of the present invention to provide a new and improved programmed manipulator arrangement for a continuously moving conveyor in which the conventional encoder is employed for the in-out axis of the manipulator during the initial portion of the program and facilities are provided for substituting the conveyor encoder as a source of command signals during a second portion of the program.

It is a further object of the present invention to provide a new and improved programmed manipulator arrangement for a continuously moving conveyor wherein the conveyor encoder is employed as a source of continuously varying command signals during a portion of the repeatable program and facilities are provided for automatically compensating for Changes in speed of the conveyor as it moves past the work station.

Briefly considered, the present invention comprises an arrangement whereby a series of articles may be loaded into a continuously moving conveyor at predetermined locations thereon by positioning the manipulator apparatus so that the out-in axis of the manipulator arm is parallel to but offset from the path of conveyor movement. After the article has been picked up from a supply station the manipulator arm is moved inwardly toward the conveyor but waits at this point until a limit switch signal signifies that a particular carrier has moved into the area of the work station. The next program step includes an auxiliary control signal which is employed to substitute a conveyor encoder, which produces a digital signal corresponding to conveyor movement, for the conventional out-in command signal from the memory. This conveyor encoder signal then is employed to move the manipulator arm in the out-in axis so that the article carried by the gripping head moves in Synchronism with the conveyor. The manipulator arm is then programmed to move downwardly to deposit the article onto one of the conveyor carriers and is then moved outwardly, during all of which time the conveyor encoder controls the out-in axis movement of the arm. Since the conveyor encoder signal is continuously changing as the conveyor moves along its path, a false coincidence signal is produced for the out-in axis of the manipulator apparatus during periods when the auxiliary control signal is present. However, after the article has been placed on the conveyor and the head moved out away from the conveyor, the conventional set of command signals for the out-in axis is substituted for the conveyor encoder signal and the gripping head returns to the initial supply station for pickup of the next article. Compensation is also provided for the speed of the conveyor so that lag between the conveyor encoder command signal and the manipulator arm is compensated.

The invention, both as to its organization and method of operation, together with further objects and advantages thereof, will best be understood by reference to the following specification taken in connection with the accompanying drawings in which.

Referring now to the drawings, the present invention is therein illustrated as including a fixed base manipulator indicated generally at 10 which is provided with a manipulator arm 12 which is pivotally movable about a vertical axis 14 to provide a rotary axis of motion. The arm 12 is also arranged to be moved in a down-up axis by tilting the arm about a horizontal axis, as described in more detail in Dunne, et al., U.S. Pat. No. 3,661,051. An article holder indicated generally at 16 is mounted on the outer end of the manipulator arm 12 and may be bodily moved relative to the base of the manipulator 10 by means of a pair of telescoping rods 18 to provide movement in a so-called out-in axis. In the present illustration the article holder 16 is provided with a pair of movable arm portions 20 which are arranged to be pneumatically actuated so as to pick up an article from a supply conveyor 22, these articles in the illustrated embodiment being cylinder heads 24 which move down the conveyor 22 until they strike an obstruction and are tilted to the angle shown in FIG. 1 which is suitable for pickup by expanding the arms 20 of the article holder 16.

In accordance with an important aspect of the invention the fixed base of the manipulator 10 is arranged so that the path of movement of the overhead guide rail 26 thereof is generally parallel to the direction of motion of the out-in axis of the manipulator 10 indicated by the arrow 28. With this arrangement, an encoder which measures movement along the conveyor guide rail 26 may be employed as a source of continuously varying command signals for the out-in axis 28 of the manipulator 10 so that the article holder 16 may be moved in synchronism with the moving conveyor without requiring the initial programming of a series of points on the out-in axis during the initial teaching mode of operation of the manipulator apparatus, such a teaching mode being described in detail in said Dunne, et al., U.S. Pat. No. 3,661,051. More particularly, it has been found that over a limited range of rotary movement about the axis 14 the errors introduced by employing the conveyor encoder as a source of command signals to move the manipulator arm in the out-in axis 28 are relatively small. For example, when movement about the rotary axis 14 is limited to 18° the errors introduced in the control of the out-in axis 28 in accordance with movement along the conveyor guide rail 26 are only of the order of 1%.

In the illustrated embodiment the conveyor guide rail 26 supports a plurality of individual carrier units, each of which comprises a double roller suspension unit 30, which rides on the bottom flange of the rail 26, and is connected to a chain 32 which is driven by means of a motorized sprocket 34 so that the suspension units 30 are pulled along the guide rails 26 in any predetermined timed relationship one with the other. A carrier frame indicated generally at 36 is pivotally mounted to the bottom of each suspension unit 30. The frame 36 includes a pair of longitudinally extending inclined portions 38 and 40 which are arranged to be engaged by rollers 42 and 44 mounted in the supporting framework 46 so that as the carrier units 36 are moved along the rail 26 the suspended frames 36 do not sway appreciably but instead are held in relatively fixed position by engagement of the rollers 42, 44 with the inclined surfaces 38, 40 on each carrier. The frame 36 also includes a bed portion 48 which is adapted to receive the article to be transported, such as the cylinder head 24. Each of the carrier frames also includes a transverse bar 50 which carries an arm 52 which is adapted to engage a microswitch 54 as the carrier 36 is moved along the guide rail 26 so that an indication is provided by closure of the contacts of the limit switch 54 when each of the carrier units 36 is moved to a position within the range of movement of the out-in axis of the manipulator 10, i.e., to a position opposite the loading station at the end of the supply conveyor 22.

In accordance with a further aspect of the invention a rotary digital encoder is provided to develop a digital signal corresponding to conveyor movement during the period of time when a conveyor carrier 36 is moved from the initial or pickup position adjacent the end of the supply conveyor 22 to a point at which the article has been deposited on the carrier and the article holder 16 moved out of the path of the carrier. In the illustrated embodiment this length of conveyor movement is made equal to the full range of movement of the manipulator 10 in the out-in axis 28, which is customarily 42 inches. Accordingly, the conveyor encoder is provided with a resolution which is the same as the out-in encoder normally employed in the manipulator 10 to measure movement in the out-in axis, as described in detail in said Dunne, et al., U.S. Pat. No. 3,661,051. Furthermore, this measured 42 inches of movement of the conveyor carrier is made equal to one revolution of the rotary conveyor encoder and this encoder is then stopped after one revolution and remains stationary until the next carrier bar 50 actuates the limit switch 54.

Figures 4, 6:
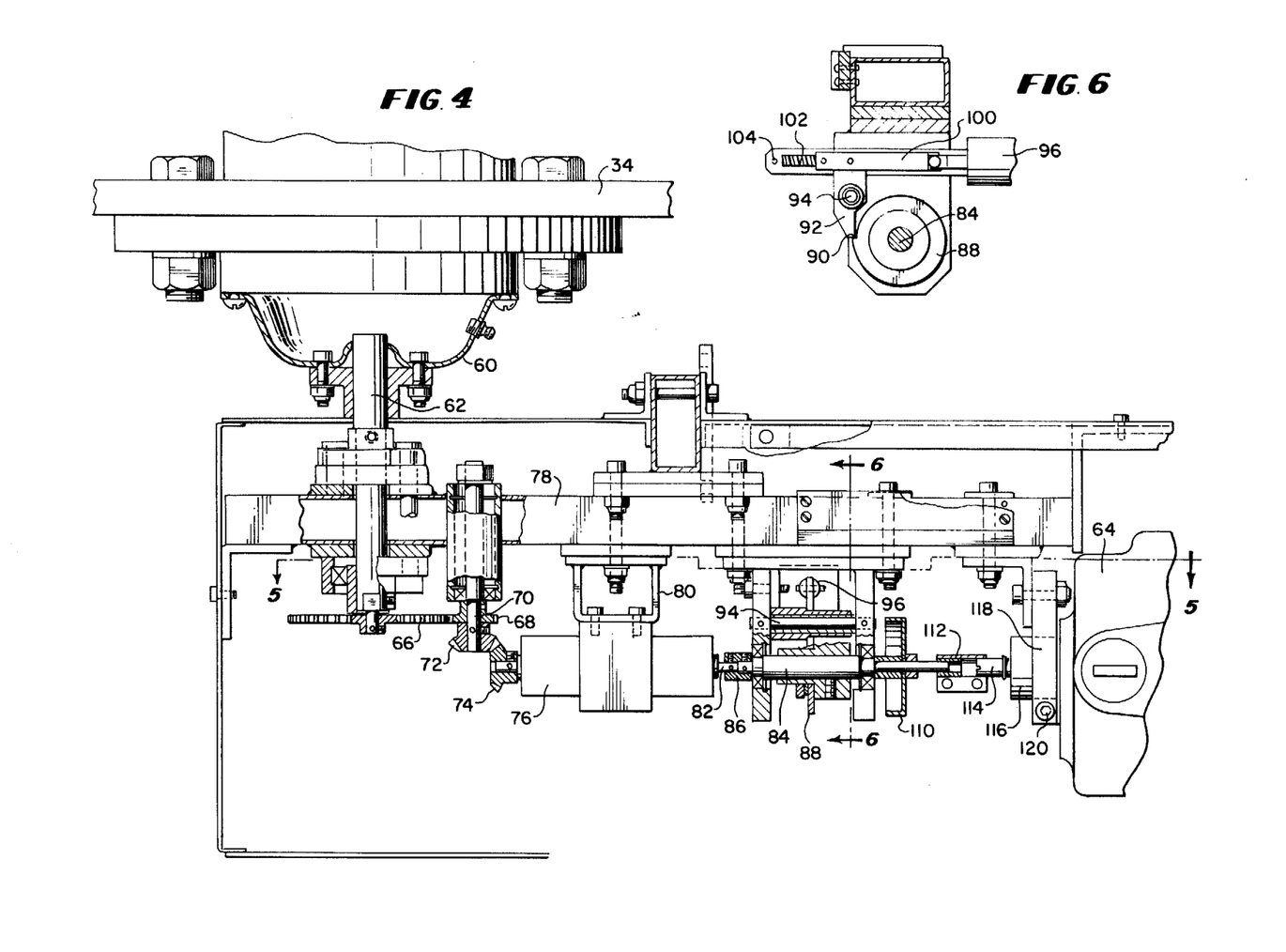
FIG. 4 is a side elevational view of the conveyor encoder drive arrangement employed in accordance with the present invention.
FIG. 6 is a sectional view taken along the line 6—6 of FIG. 4.
Figure 5:
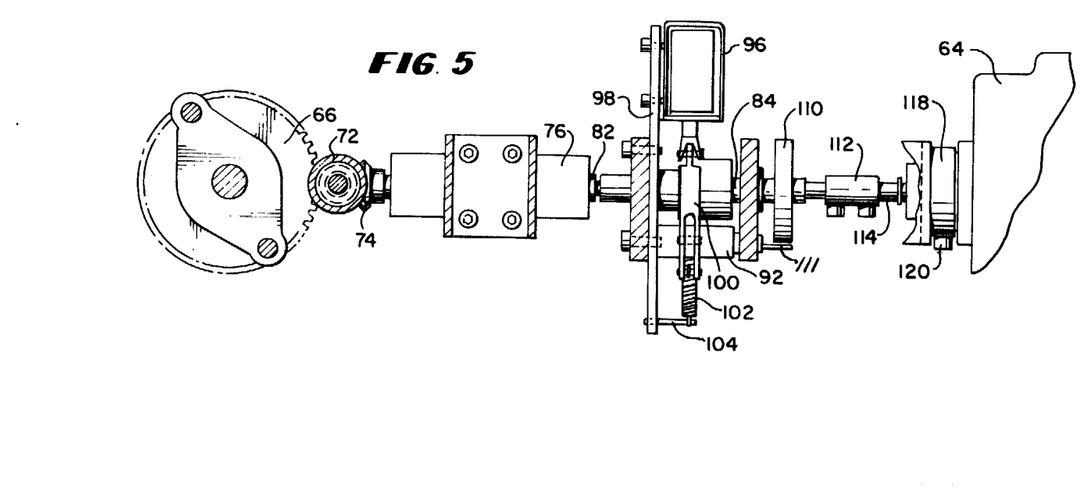
FIG. 5 is a sectional view taken along the lines 5—5 of FIG. 4.

Considering now the encoder drive mechanism which is shown in more detail in FIGS. 4, 5 and 6, the sprocket 34 has a dish shaped housing 60 secured to the underside thereof, the housing supporting a shaft 62 which acts as the encoder drive shaft for the conveyor encoder 64. Preferably, the conveyor encoder 64 is of the type shown and described in Leonard U.S. Pat. No. 3,525,094 wherein a suitable light source and complementary coded discs and masks are employed to develop a multi-bit digital signal corresponding to rotation of an input shaft. However, it will be understood that any other suitable type of rotary digital encoder may be employed for the conveyor encoder 64 insofar as the present invention is concerned, it being noted that this rotary encoder must be capable of producing a digital output signal having the same resolution as the out-in encoder employed in the manipulator apparatus 10. For example, in said Dunne, et al., U.S. Pat. No. 3,661,051 the out-in encoder is illustrated as developing a ten-bit digital signal. Accordingly, the conveyor encoder 64 would be required to produce a digital signal of similar resolution.

The conveyor encoder drive shaft 62 is employed to drive a spur gear 66 secured to the bottom end thereof, the gear 66 in turn driving a spur gear 68 which is mounted on a stub shaft 70. A pair of meshing beveled gears 72, 74 are employed to drive a magnetic clutch 76 which is mounted on the conveyor encoder drive frame 78 by means of the bracket 80. The magnetic clutch 76 is continuously energized and the output shaft 82 thereof is connected to a one revolution clutch shaft 84 through the coupler 86. A clutch plate 88 is secured to the shaft 84 and is provided with a notch 90 in the periphery thereof which is adapted to be engaged by the end of a pawl 92 pivotally mounted on the pin 94. A solenoid 96 is mounted on a plate 98 and is pivotally connected to a solenoid link member 100 the other end of which is connected to an extension spring 102 which is in turn connected to a pin 104 carried by the plate 98. Accordingly, the pawl 92 is normally urged by the spring 102 so that the tip of the pawl 92 is in engagement with the notch 90 on the plate 88. Under these conditions the shaft 84 is restrained from movement even though the conveyor drive input shaft 62 is continuously rotating and the magnetic clutch 76 under these conditions slips. However, when the limit switch 54 is actuated, indicating that a carrier 36 has been moved to the desired pickup position, the solenoid 96 is energized. The limit switch signal is also employed as a wait external signal for the manipulator apparatus 10 to enable the succeeding program steps involving the deposit of the cylinder head 24 on one of the carriers 36, as will be described in more detail hereinafter. When the solenoid is energized it pivots the pawl 92 about the pin 94 so that the tip of the pawl 92 is moved out of engagement with the notch 90. When this occurs the shaft 84 is permitted to rotate one full revolution at which point the pawl 92, which is now biased by means of the spring 104, engages the notch 90 and stops rotation of the shaft 84.

If desired, a second limit switch 106 may be arranged to be actuated by means of a spring biased wand 108 which senses whether or not a cylinder head 24 has already been positioned on the particular carrier 36 as it moves past the limit switch 54. Under these conditions it is of course not desired to load an additional cylinder head onto this carrier. Accordingly, the limit switches 54 and 106 are connected in series and are employed to energize the solenoid 96 and as a wait external signal for the manipulator 10, only when both switches are closed.

The shaft 84 carries a dial member 110 thereon, cooperating with a fixed indexing marker 111 (FIG. 5) and is coupled through the coupling 112 to the input shaft 114 of the rotary conveyor encoder 64. The housing 116 of the encoder 64 is clamped by means of the collar 118 which in turn is secured to the frame 78. Accordingly, by loosening the collar 118, by means of the bolt 120, the housing of the conveyor 64 may be adjusted to a desired position relative to the rotor shaft 114 thereof, as will be described in more detail hereinafter.

Figure 8:
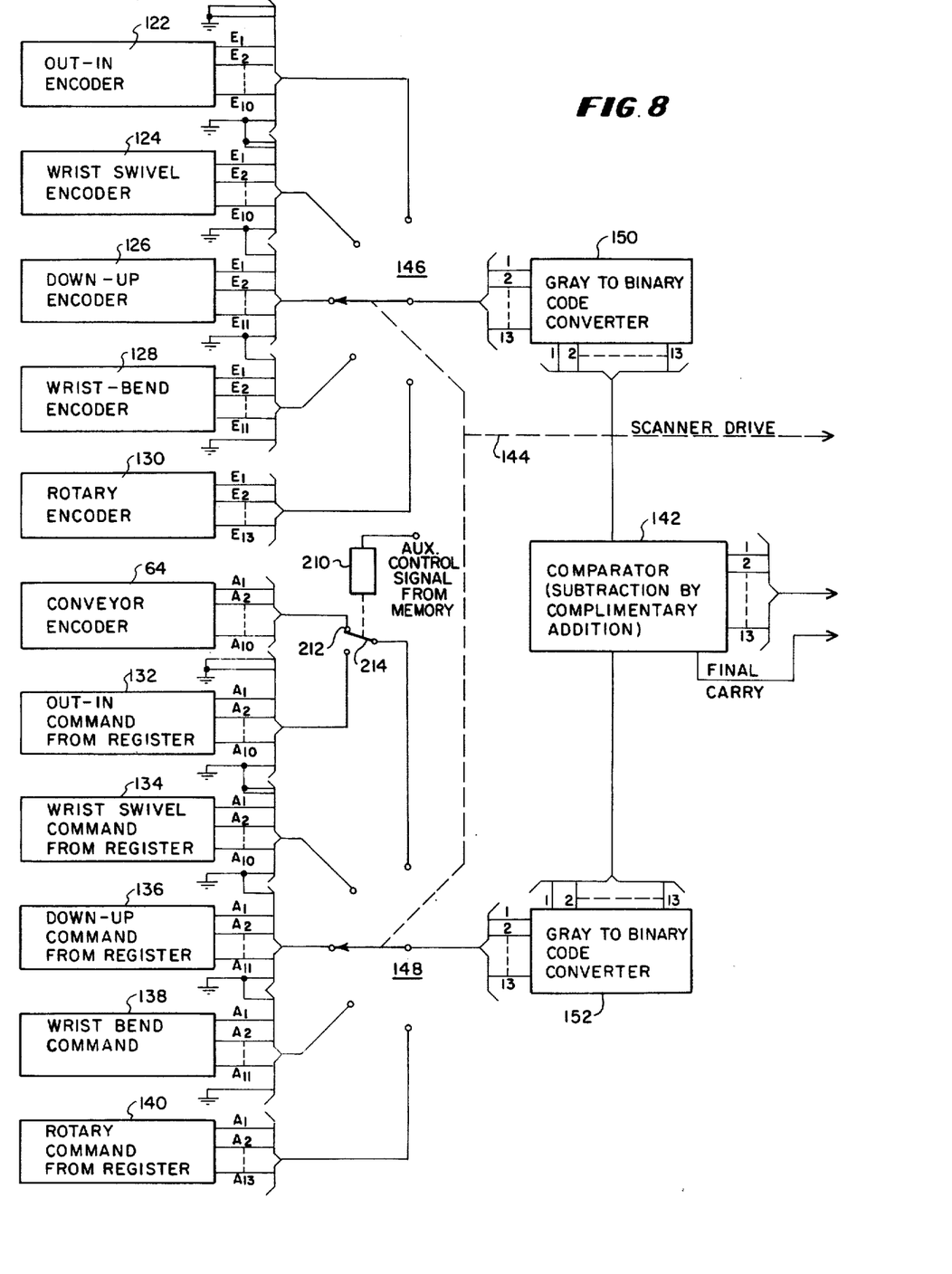
FIGS. 8 and 9 when arranged in the manner shown in FIG. 8A comprise a block diagram of the electronic circuitry employed in accordance with the present invention to provide command signals from the conveyor encoder during certain portions of the program.
Figures 8A, 9:
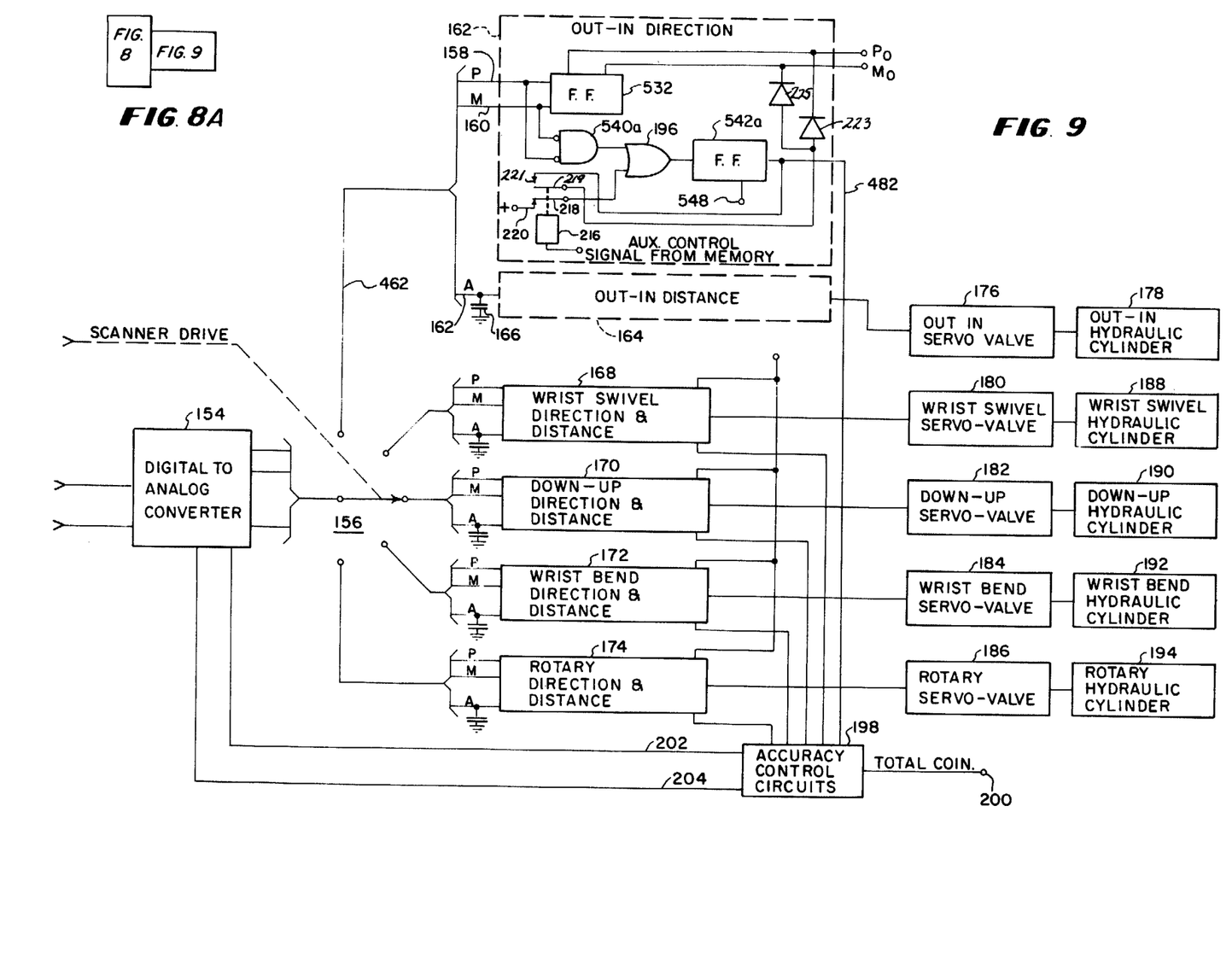

Considering now the electronic circuitry of the manipulator apparatus 10 which is employed in accordance with the present invention to effect a changeover from the normal out-in command signal to the digital signal developed by the conveyor encoder 64, and referring to FIGS. 8 and 9 of the drawings, it is first pointed out that this electronic circuitry is generally similar to that described in the above-identified Dunne, et al., U.S. Pat. No. 3,661,051 and reference may be had to said Dunne et al patent for a detailed description of both the teaching and playback modes of operation of such electronic circuitry. However, for purposes of the present invention it may be stated that the five encoders individually associated with the five controlled axes of the manipulator apparatus are shown as the out-in encoder 122, the wrist swivel encoder 124, the down-up encoder 126, the wrist-bend encoder 128 and the rotary encoder 130, the conveyor encoder 64 also being shown in FIG. 8 as having ten digital output conductors A1, A2–A10 corresponding to the ten output conductors E1, E2–E10 of the out-in encoder 122.

In a similar manner the five command signals which are normally read from the memory storage drum and employed as fixed command signals to control movement of the manipulator arm 12 to a desired point are shown as the out-in command 132, the wrist swivel command 134, the down-up command 136, the wrist-bend command 138 and the rotary command 140. In this connection it will be understood that these command signals are originally derived from the memory drum and are stored in a buffer storage register while the previously read set of command signals is employed to move the manipulator arm, as described in detail in said Dunne, et al., U.S. Pat. No. 3,661,051.

The corresponding encoder signal and command signal for each axis are sequentially compared in a comparator 142, the two inputs to the comparator 142 being sequentially multiplexed to the individual encoder signals and command signals for each axis through a scanner drive multiplexing arrangement indicated generally at 144 and the multiplex switches 146 and 148, the gray-to-binary code converters 150 and 152 being employed to convert the gray code signals developed by the encoders 122 to 130, inclusive, and the corresponding command signals to binary code before application to the comparator 142. The output of the comparator 142 is supplied to a digital to analog converter 154 and is then distributed by means of the distributor multiplex switch 156 to the direction and distance circuits corresponding to each axis. More particularly, a plus or minus signal is applied over the conductor 158 or 160 to the out-in direction circuit indicated generally at 162, these direction signals being dependent upon the direction in which the manipulator arm 12 is to be moved to reduce the error signal developed by the digital-to-analog converter 154 to zero. The actual value of the error signal is also applied to a conductor 163 in the out-in distance circuit 164 and is stored in a capacitor 166 while the other axes are being scanned by the switch 156, as described in detail in said Dunne, et al., U.S. Pat. No. 3,661,051. In a similar manner direction and distance signals are supplied to the wrist swivel circuits 168 the down-up circuits 170, the wrist-bend circuits 172, and the rotary circuits 174. The output of each distance circuit is supplied to a corresponding servo valve which is employed to control movement of the corresponding hydraulic cylinder so that the manipulator arm is moved in the desired axis. Thus, the amplified error signal developed by the out-in distance circuit 164 is supplied to the out-in servo valve 176 which controls the out-in hydraulic cylinder 178. In a similar manner the wrist swivel servo valve 180, the down-up servo valve 182, the wrist-bend servo valve 184 and the rotary servo valve 186 control respectively the hydraulic cylinders 188, 190, 192 and 194.

As described in detail in Dunne, et al., U.S. Pat. No. 3,661,051 the next step in a given program may be selected whenever the manipulator arm has been moved to the previously programmed point with a particular designated accuracy. Thus, if the manipulator arm 12 has been moved exactly to the programmed point, the signals on the positive conductor 158 and minus conductor 160 will both be negative so that a signal is transmitted through the AND-gate 540a and through an OR-gate 196 to a flip-flop circuit 542a which is then set. When the flip-flop 542a is set a signal appears on the conductor 482 which is supplied to the accuracy control circuits indicated generally at 198. When all of the programmed movements in each of the other axes have also been exactly accomplished the accuracy control circuits 198 function to develop a total coincidence signal at the terminal 200 which is then employed to step the memory drum to the next programmed step. Such an accuracy measurement is called accuracy No. 1 and if less accurate positioning of the manipulator arm to the desired programmed point is acceptable then so-called accuracy No. 2 or accuracy No. 3 signals derived from the digital to analog converter 154 and supplied over the conductors 202 and 204 to the accuracy control circuits 198 may also be employed to develop a total coincidence signal when the error signals in all axes reach a predetermined value. All of the above-described electronic circuitry for the five controlled axes of the manipulator is described in detail in said Dunne, et al., U.S. Pat. No. 3,661,051 and hence a detailed description thereof is not considered necessary herein.

Figure 1:
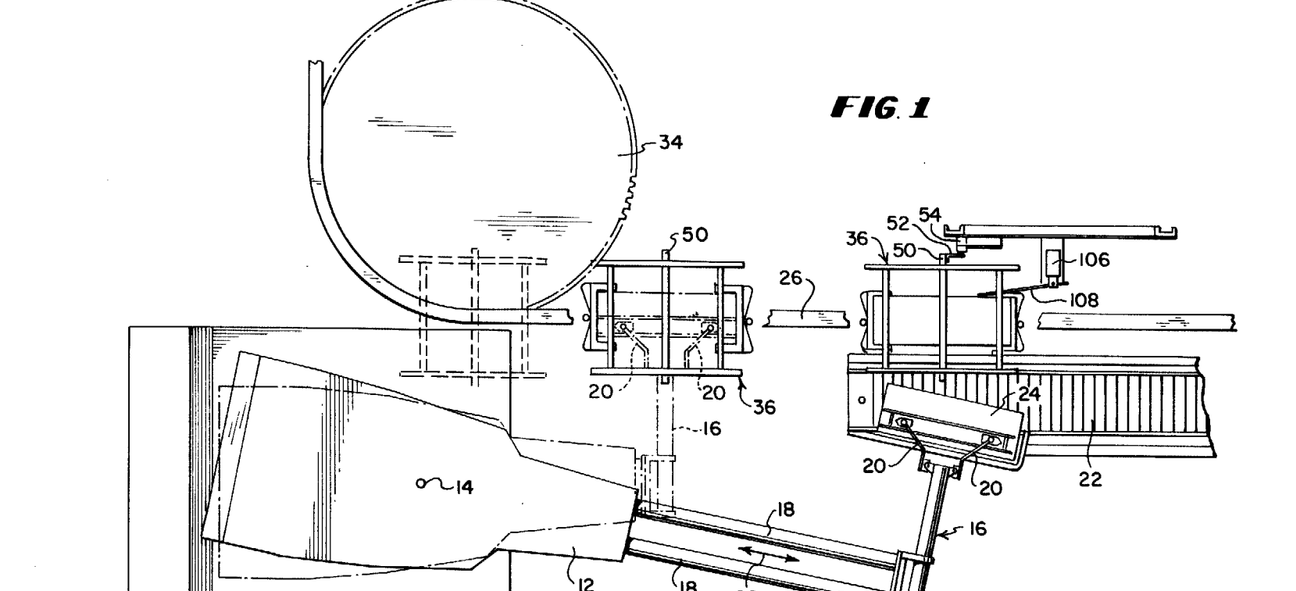
FIG. 1 is a plan view of a programmed manipulator apparatus and continuously moving conveyor embodying features of the present invention.
Figures 2, 3:
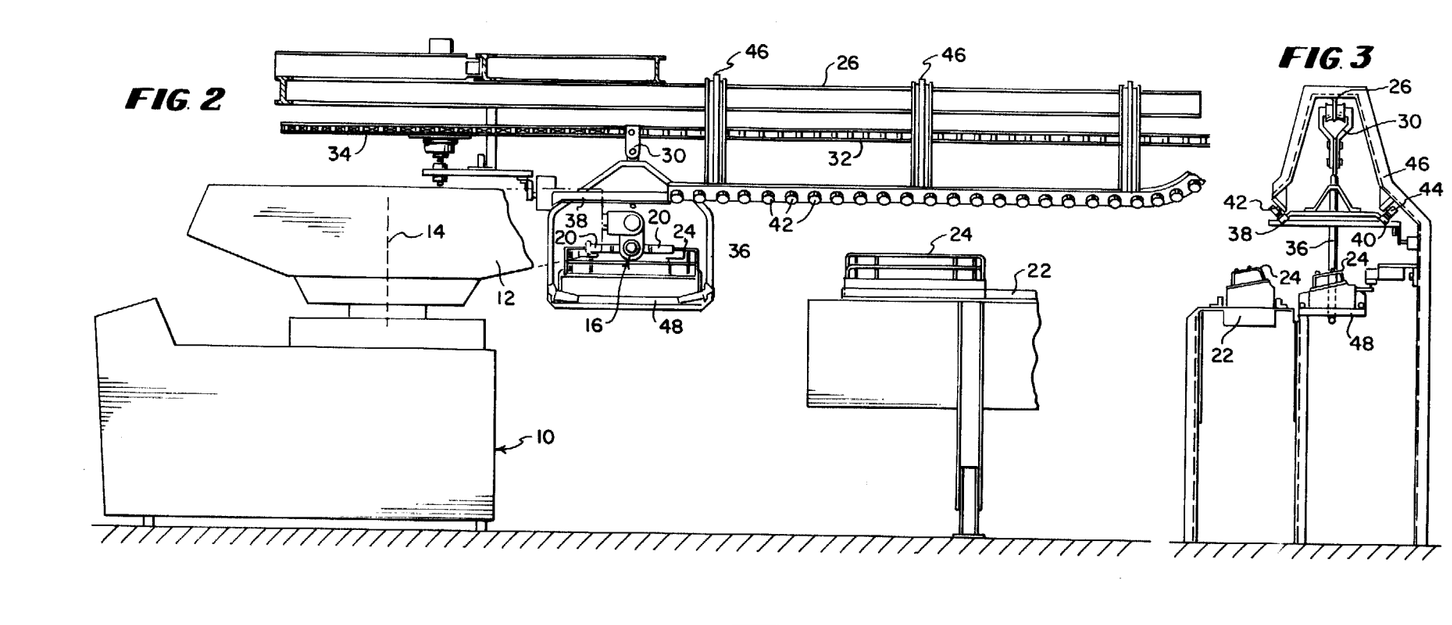
FIG. 2 is a side elevational view of the conveyor arrangement of FIG. 1.
FIG. 3 is a right hand view of the conveyor apparatus of FIG. 2.

Considering now the manner in which the manipulator 10 is programmed during the teaching mode of operation of the apparatus and in accordance with the present invention, with a cylinder head 24 positioned at the point shown in full lines in FIG. 1 on the supply conveyor 22 the manipulator arm is moved under the control of a teach control unit and as described in detail in said Dunne, et al., U.S. Pat. No. 3,661,051, so that the article holder arms 20 move inwardly over the cylinder head 24 and downwardly so that the arms may be actuated outwardly to grasp the cylinder head 24. The wrist-bend axis is also controlled so that the hand is pointing down, as shown in FIG. 2 so that motion in the wrist swivel axis can be employed to align the cylinder head 24 with the conveyor path after it is picked up. The manipulator arm is then moved under the control of the teach control unit so that the grasped cylinder head 24 is lifted off the conveyor 22 and is moved inwardly, by motion about the rotary axis 14 to a point just outside the path of the carriers 36 which are moving along the monorail 26. A programmed WX or wait external signal is also recorded at this point in the program so that during playback selection of the next programmed step will be delayed until a signal is developed by the limit switch 54, or the limit switches 54 and 106 in series. For the next program step the manipulator arm 12 is moved fully inward toward the conveyor monorail 26 so that the cylinder head 24 is positioned in line with one of the carriers 36 which has just engaged the limit switch 54. An auxiliary control signal is also recorded during this program step which is employed to shift control from a conventional out-in command signal channel to the conveyor encoder 64, as will be described in more detail hereinafter during the playback phase of operation. The manipulator arm is then moved in the down-up axis and if necessary in the wrist swivel axis so that the cylinder head 24 is deposited on the base 48 of the carrier 36 while this carrier remains in a fixed position adjacent the limit switch 54. An auxiliary control signal is also recorded at this program step. The next program step is release of the gripping fingers 20 and during this program step an auxiliary control signal is also recorded. The next program step is to move the article holder 16 upwardly slightly to provide clearance between the fingers 20 and the deposited cylinder head on one of the carriers 36. An auxiliary signal is also recorded at this program step. The article holder 16 is then programmed to move outwardly beyond the path of the conveyor carriers 36 and an auxiliary control signal is also recorded during this program step. The final program step is one in which the manipulator arm is moved back to its initial position shown in full lines in FIG. 1 and during this program step no auxiliary control signal is recorded since movement in the out-in axis need no longer be synchronized with movement of the conveyor carrier 36. It will be noted that in the teaching mode there is no requirement for recording of a multiplicity of conveyor positions corresponding to movement of the conveyor during the period when the cylinder head is moved inwardly, deposited on the carrier 36, released, and the holder 16 is moved outwardly beyond the path of the carriers. Accordingly, the number of program steps required during the teaching or programming of the manipulator apparatus in accordance with the present invention is greatly reduced over that required in arrangements such as shown in Engelberger, et al., U.S. Pat. No. 3,744,032.

Considering now the operation of the manipulator apparatus 10 during the playback or repeat mode of operation, and assuming that the manipulator apparatus is in the position shown in full lines in FIG. 1, the gripping fingers 20 are moved inwardly and downwardly to grasp a cylinder head 24 on the conveyor 22 and this head is moved upwardly and inwardly to a point adjacent the path of the carriers 36 during the first recorded program steps. However, the manipulator arm does not move further inwardly until a WX signal is received by closure of the limit switch 54. When this occurs the next program step is selected in which the cylinder head is to be moved inwardly in line with the carrier 36. However, this movement must be synchronized with the continuous movement of the carrier 36. This is accomplished in response to the auxiliary control signal which has also been recorded at this program step. This auxiliary control signal is supplied to a relay 210 (FIG. 8) and actuates this relay so that the multi-digit output signal of the out-in command 132 is no longer connected to the multiplexer switch 148 and instead the ten-bit output of the conveyor encoder signal 64 is supplied through the multiple contacts 212 and arms 214 of the relay 210 to this distributor. At the same time the auxiliary control signal is supplied to a relay 216 in the out-in direction circuit 162, so that this relay is also energized. When the relay 216 is energized the arm 218 thereof closes a contact 220 which is connected to a plus voltage supply and so that a signal is supplied to the other input of the OR-gate 196. This signal passes through the OR-gate 196 and sets the flip-flop 542a so that an accuracy No. 1 coincidence signal is produced on the conductor 482. Thus, the auxiliary control signal which has been programmed at this particular program step functions to provide a false out-in coincidence signal for the out-in axis even though movement in the out-in direction has just barely started. However, since the manipulator arm is to be moved inwardly by motion in the rotary axis 14 the rotary direction and distance circuits 174 have not yet reached coincidence and hence a total coincidence signal is not yet produced on the terminal 200 so that the next program step is not selected.

When the relay 216 is energized the arm 219 thereof also opens the contact 221. When the contact 221 is closed, during normal operation of the manipulator 10, the output of the flip-flop 542a is supplied through the diodes 223 and 225 to the conductors Po and Mo and has the effect of disabling the servo valve 176, as described in detail in said Dunne, et al., U.S. Pat. No. 3,661,051. However, during control of the out-in axis by the conveyor encoder 64 it is necessary that the out-in servo valve 176 and cylinder 178 function properly even though an artificial coincidence signal is produced for this axis by closure of the contact 220. Accordingly, when this false coincidence signal is produced, the contact 221 is opened, thereby removing the disabling signal from the conductors Po and Mo. In this connection, it will be understood that a false coincidence signal for the out-in axis may be employed even though the other axes of the manipulator are controlled to accuracy No. 2 or accuracy No. 3, in the event that a particular step or steps of the program need not be performed with an accuracy as precise as accuracy No. 1. In such case, the false coincidence signal on the conductor 482 is simply combined with the desired accuracy No. 2 or No. 3 conductors for the other axes to obtain the total coincidence signal at the terminal 200.

Considering now the effect of substituting the conveyor encoder 64 for the out-in command signal normally supplied from the buffer storage register, since the conveyor is continuously moving and the solenoid 96 has been actuated by the same limit switch signal derived from the limit switch 54 (or the limit switches 54 and 106 in series) the out-in direction and distance circuits 162 and 164 function in the conventional manner to move the out-in hydraulic cylinder 178 so that the article holder 16 is moved generally in synchronism with the conveyor carrier 36 as this article holder is moved inwardly to position the cylinder head 24 immediately over the base 48 of the carrier 36. In this connection it is pointed out that since this arcuate movement about the rotary axis 14 is only a few degrees the error introduced by employing the conveyor encoder signal as an out-in command signal is very small and does not appreciably affect the accuracy with which the cylinder head is moved relative to the conveyor.

When the inward movement of the article holder has been completed a total coincidence signal is produced on the terminal 200 and the next program step is selected. In accordance with this program step the article holder 16 is to be moved downwardly so as to deposit the cylinder head 24 onto the base 48. However, an auxiliary control signal was also recorded during the teaching mode at this program step so that the conveyor encoder 64 continues to function as a source of command signals for the out-in axis and the article holder 16 continues to be moved to the left as viewed in FIG. 1 in synchronism with the conveyor as the cylinder head is deposited on the base 48. While the flip-flop 542a is arranged to be reset at the selection of each new program step, by application of a pulse to the terminal 548 as described in detail in said Dunne, et al., U.S. Pat. No. 3,661,051, the relay 216 is again energized by the auxiliary control signal recorded at the new program step so that the flip-flop 542a is immediately reset by closure of the contact 220.

During the next program steps the cylinder head is released, the article holder 16 is moved upwardly slightly and then moved outwardly to clear the carrier 36, the conveyor encoder 64 being employed during all of these program steps to control movement of the manipulator arm in the out-in axis 28 since an auxiliary control signal was recorded during each of these program steps, as described above during the teaching mode of operation of the manipulator 10. As a result, the article holder 16 is moved to the position shown in dotted lines in FIG. 1 at the end of these program steps and has been maintained in synchronism with the conveyor carrier 36 during this entire motion in the out-in axis 28. However, after the article holder 16 has been moved outwardly beyond the path of the carrier 36 it is then moved back to its initial position shown in full lines in FIG. 1 under the control of the out-in command 132 since synchronism with the conveyor is no longer required. This is accomplished simply by the absence of an auxiliary signal for these program steps so that the relays 210 and 216 are not energized. In this connection it will be noted that the movement in synchronism with the conveyor is accomplished during one revolution of the conveyor encoder 64 and at the end of this revolution the pawl 92 again engages the notch 90 so that the conveyor encoder 64 remains at its initial setting until the next time the solenoid 96 is actuated during the next programmed cycle. The conveyor encoder 64 is thus arranged to provide a ten bit digital signal corresponding to movement of approximately 42 inches in the out-in axis 28. It will also be understood that other types of programs may be employed and the principles of the present invention still utilized. It is only required that the controlling movement which is encoded, i.e., the conveyor movement in the illustrated embodiment, should be parallel to the axis of the manipulator apparatus 10 which it controls and only limited lateral shifts with respect to this axis should be made during the program so that acceptable errors between the commanded position and the actual position in the out-in axis are developed during synchronous movement with the conveyor. It will also be understood that other types of work handling or work performing operations may be employed on a workpiece positioned on a moving conveyor. For example, a paint spraying or spot welding head may be attached to the end of the manipulator arm 12 and a series of work operations performed on a substantially vertical section of the workpieces as it moves along in a direction parallel to the out-in axis of the manipulator 10.

While closure of the limit switch 54 is employed as an initiation signal to shift control of the out-in axis to the conveyor encoder 64, it will be understood that a certain lag is produced between the position indicated by the conveyor encoder 64 and the actual physical position of the article holder 16 in the out-in axis 28. This is because the conveyor carrier 36 is continuously moving and will have developed a command signal of a certain magnitude before the error signal developed by the comparator 142 functions to move the article holder 16 in the out-in axis in the same direction as the conveyor.

In order to compensate for this lag in the out-in axis, the housing of the conveyor encoder 64 may be adjusted by loosening the clamp 118 and the housing is moved such that the digital signal developed by the conveyor encoder 64 is actually somewhat greater than the physical position of the conveyor carrier 36 as it moves along the conveyor path. Thus, if a lag of two inches is experienced when the encoder 64 is used to control the out-in axis, the housing of the conveyor encoder 64 is shifted so that its digital output signal corresponds to two inches when it is in its initial position at the time the solenoid 96 is actuated.

Figure 7:
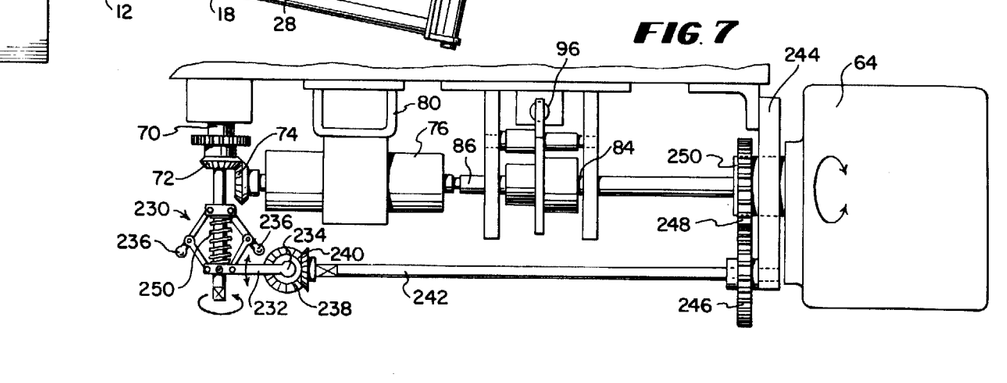
FIG. 7 is a side elevational view of an alternative embodiment which provides compensation for conveyor speed.

The above-described compensation for lag in response of the out-in axis to the continuously varying conveyor encoder command signal is based on the assumption that the conveyor moves at a constant speed. In the event that the conveyor speed varies, or is not known at the time the initial program is made, the arrangement shown in FIG. 7 may be employed whereby automatic compensation for lag in the out-in axis is achieved. Thus, referring to this figure, a speed conveyor 230 is mounted on the end of the shaft 70 and the output arm 232 thereof is arranged to pivot about an axis 234 when the position of the balls 236 varies in accordance with the speed of rotation of the shaft 70, as will be readily understood by those skilled in the art. The arm 232 carries a beveled gear 238 which is in mesh with a beveled gear 240 on a shaft 242 the other end of which is rotatably mounted in the mounting bracket 244 for the conveyor encoder 64. A gear 246 is secured to the shaft 242 and engages a spur gear 248 which is secured to the housing 250 of the conveyor encoder 64. Accordingly, when the conveyor is standing still the arm 232 is forced downwardly by the spring 252 so that the arm 232 is in its downwardmost position in which position the housing of the encoder 64 is set to provide a zero digital output signal from the encoder 64. As the speed of the conveyor increases the balls 236 fly outwardly and the arm 232 is pivoted upwardly so as to rotate the shaft 242 and through the gears 246 and 248 the housing 250 of the encoder 64 in proportion to conveyor speed. Accordingly, the above-described lag during periods when the conveyor encoder is used as a source of command signals is automatically compensated in accordance with the arrangement of FIG. 7.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a programmed manipulator, the combination of, a manipulator arm, means for moving said arm along a plurality of axes, a continuously moving conveyor positioned adjacent said programmed manipulator, first encoder means for developing a digital signal corresponding to the absolute position of said arm in one of said axes, second encoder means for developing a digital signal representing the actual position of said conveyor, means for developing a sequence of digital command signals having one component corresponding to desired positions of said arm along said one axis, means for comparing the encoder signal of said first encoder means and said one component of one of said command signals to develop an error signal equal to the difference therebetween, means responsive to said error signal for controlling said moving means to move said arm along said one axis in the direction to reduce said error signal, at least some of said command signals including an auxiliary control signal, and means responsive to said auxiliary control signal for connecting said second encoder means to said comparing means in place of said one component of said command signal, whereby the encoder signal of said second encoder means acts as a continuously variable series of command signals to control movement of said manipulator arm in said one axis in accordance with movement of said conveyor along the path thereof.

2. The combination of claim 1, wherein said one axis is the out-in axis of said manipulator arm along which the arm is extended or contracted.

3. The combination of claim 2, wherein said manipulator has a fixed base which is positioned relatively close to said conveyor path so that said second encoder means may be employed as a source of command signals for the out-in axis of said manipulator arm without introducing substantial error.

4. The combination of claim 1, which includes means for normally developing a total coincidence signal when said error signal is reduced to a predetermined magnitude, means responsive to said total coincidence signal for connecting the next command signal in said sequence to said comparing means, and means responsive to said auxiliary control signal for developing a false coincidence signal for said one axis, whereby said sequence of command signals is employed to move said manipulator arm to different positions while said second encoder means continues to control movement of said arm in said one axis.

5. The combination of claim 1, which includes means for supplying articles to be placed on said conveyor at a pickup station adjacent said manipulator, and said sequence of digital command signals is effective to control said arm to seize an article at said pickup station and deposit it in a predetermined orientation on said continuously moving conveyor.

6. The combination of claim 5, wherein said conveyor includes a series of carriers on which articles are to be placed, and means responsive to movement of one of said carriers to a predetermined position for initiating said sequence of command signals.

7. The combination of claim 1, wherein said first and second encoder means both have the same resolution in terms of bits per increment of motion.

8. The combination of claim 1, wherein said second encoder means is a rotary encoder having a housing and a code wheel rotatably mounted therein, and gearing means interconnecting said conveyor and said code wheel so that said code wheel is rotated one full revolution in response to a predetermined movement of said conveyor along said path.

9. The combination of claim 8, which includes means for adjustably positioning said housing of said rotary encoder, thereby to compensate for lag in the movement of said manipulator arm relative to said conveyor.

10. The combination of claim 8, which includes a clutch included in said gearing between said conveyor and said code wheel for disconnecting said code wheel from said conveyor after a predetermined rotation of said code wheel.

11. The combination of claim 10, which includes a notched disc connected to said code wheel, a pawl member normally in engagement with said notched disc and operative to prevent said code wheel from rotating, and solenoid means for actuating said pawl member to permit rotation of said code wheel through said clutch means.

12. The combination of claim 11, wherein said conveyor includes a series of carriers on which articles are to be placed, and means responsive to mvoement of one of said carriers to a predetermined position for energizing said solenoid means.

* * * * *